INVENTORS.
Wayne D. Wilson
Benjamin L. Snavely

ATTORNEY.

Feb. 13, 1968 W. D. WILSON ET AL 3,368,393
DIFFERENTIAL TRANSFORMER DENSITOMETER
Filed Jan. 26, 1965 2 Sheets-Sheet 2

INVENTORS.
Wayne D. Wilson
Benjamin L. Snavely

BY

ATTORNEY.

3,368,393
DIFFERENTIAL TRANSFORMER DENSITOMETER
Wayne D. Wilson and Benjamin L. Snavely, Silver Spring, Md., assignors to the United States of America as represented by the Secretary of the Navy
Filed Jan. 26, 1965, Ser. No. 428,270
5 Claims. (Cl. 73—94)

ABSTRACT OF THE DISCLOSURE

A densitometer for measuring the compressibility of liquids in which a bellows containing a liquid to be tested is surrounded by a liquid medium. Pressure applied to the external surfaces of the bellows through the liquid medium causes a compression of the liquid within the bellows and a corresponding shortening of the bellows. The bellows is connected to a secondary winding of a differential transformer for movement therewith. A second differential transformer is employed in which the lateral movement of the secondary winding is adjustable, the movement thereof being measured by a micrometer. A bridge circuit connecting the two transformers provides for measuring the displacement in the bellows by observing the displacement of the micrometer necessary to rebalance the bridge corresponding to the movement of the bellows.

---

Figure 1:
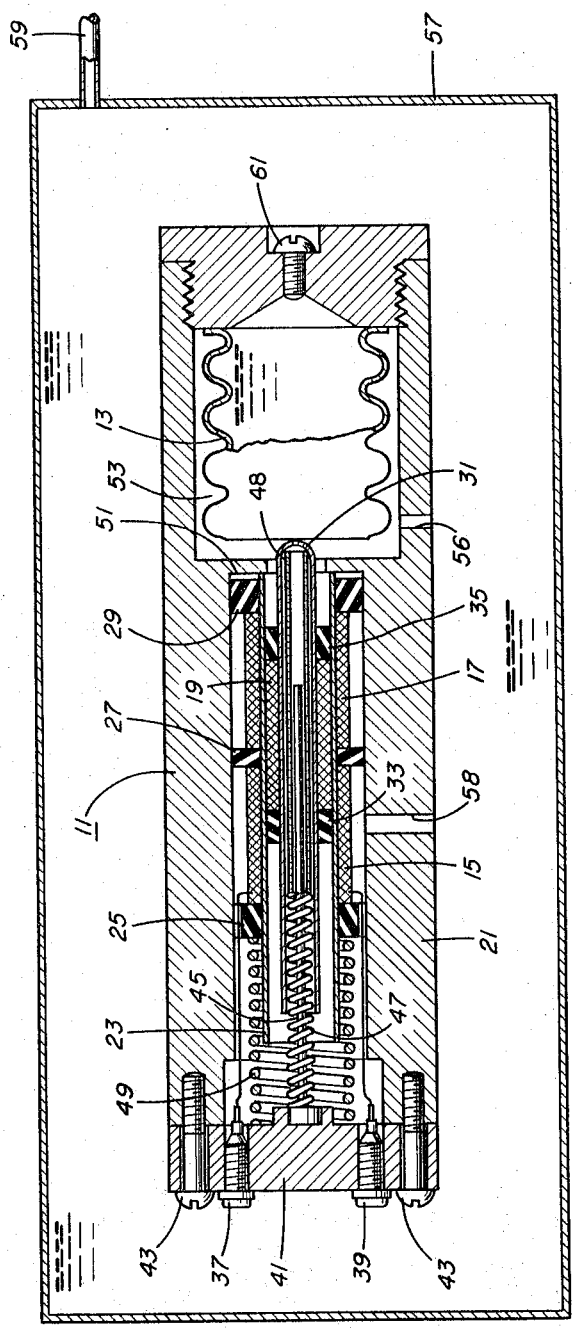

The invention described herein may be manufactured and used by or for the Government of the United States of America for governmental purposes without the payment of any royalties thereon or therefor.

This invention relates generally to a densitometer and more particularly to a pair of differential transformers used in a bridge circuit to measure the density and compressibility of liquids as a function of temperature for pressures up to 15,000 pounds per square inch. This apparatus may also be used as a pressure gage. Old apparatus and methods for measuring density normally involved instruments which cannot be used at pressures much greater than atmospheric pressure. Since it is desired to measure density of liquids at high pressures, a new and unique circuit employing a pair of differential transformers was employed which is capable of measuring the density of liquids as a function of temperature at very high pressures. This eliminated the disadvantage of the old type of density measuring instruments which cannot be used at pressures which are substantially greater than atmospheric pressure.

The densitometer of this invention employs two substantially identical differential transformers which are arranged in a bridge circuit which may be balanced to give a zero electrical output. The primary winding which is center tapped is wound such that two halves of the coil are connected in series opposing relationship. This coil is wrapped around a quartz tube. The secondary winding of the transformer is mounted coaxially within the primary coil and axially slideable therein. When the secondary winding is exactly between the two primary windings there will be no output voltage in the secondary winding when the primary windings are energized. Movement in either direction from the center position of the secondary coil, however, will cause an output voltage in the secondary winding. A first of the differential transformers of this invention is provided with a bellows for axially moving the secondary coil and a second differential transformer of this invention is provided with a micrometer head arrangement for moving the secondary coil and indicating the magnitude of the linear displacement of the coil. With the first and second differential transformers as described connected into a bridge circuit, the movement of the secondary coil caused by the movement of the bellows can be duplicated in the second differential transformer by a movement of the micrometer head and this movement is indicated on the micrometer scale.

It is an object of this invention to provide apparatus for measuring the density of liquids as the function of temperature for pressures up to 15,000 pounds per square inch.

It is another object of this invention to provide a bridge circuit containing two differential transformers for use as a pressure measuring device.

It is still another object of this invention to provide an electrical bridge network employing two differential transformers for determining the compressibility of liquids.

It is a further object of this invention to provide a differential transformer which may be used for measuring the density of liquids.

It is yet a further object of this invention to provide a circuit employing differential transformers for determining compressibility of liquids.

Figure 2:
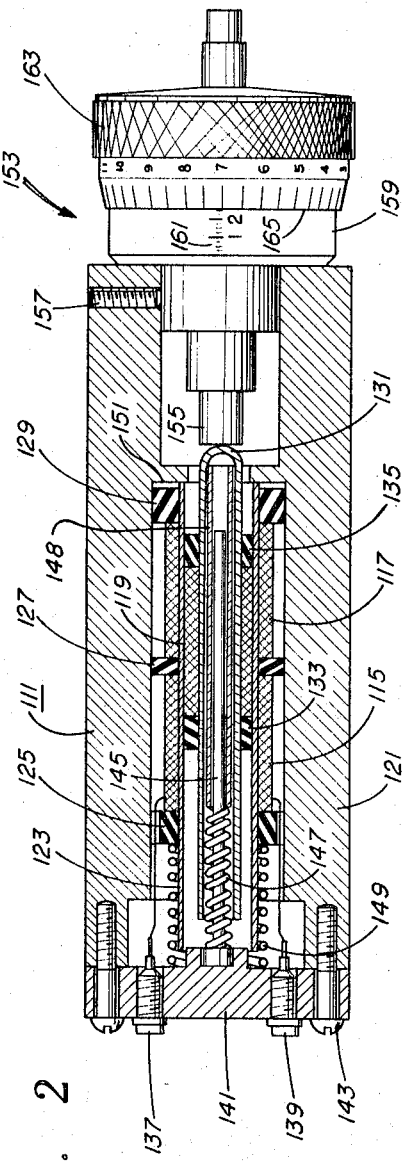
Figure 3:
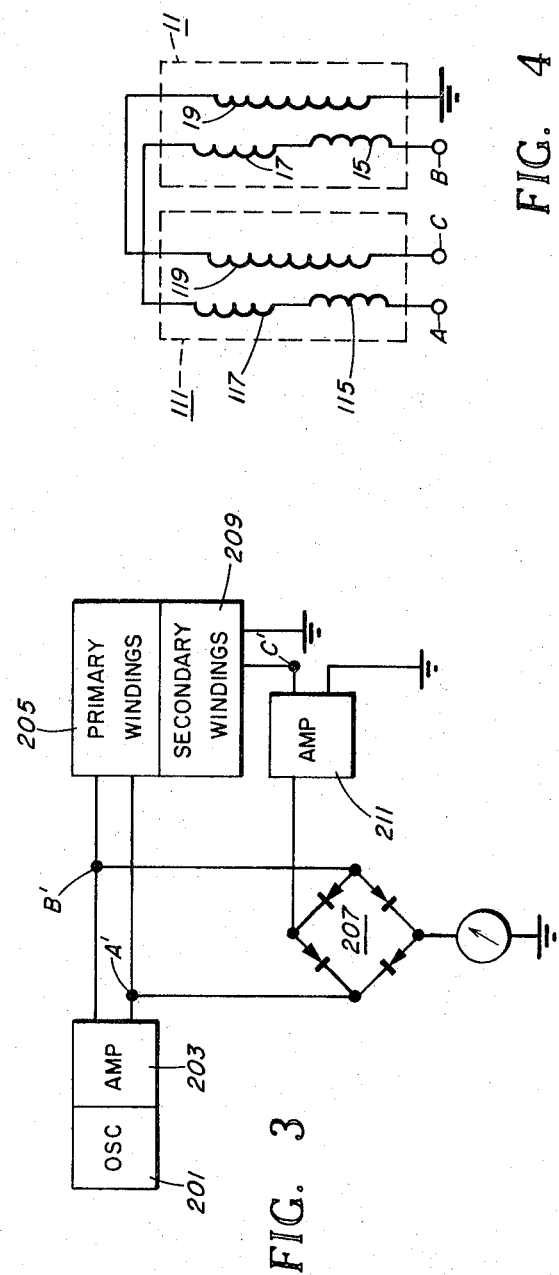

Other objects and many of the attendant advantages of this invention will be readily appreciated as the same becomes better understood by reference to the following detailed description when considered in connection with the accompanying drawings wherein:

FIG. 1 of this invention related to a differential transformer in combination with the bellows;

FIG. 2 of the drawings illustrates a differential transformer of this invention in combination with the micrometer head;

FIG. 3 of the drawings illustrates a bridge circuit of this invention; and

Figure 4:
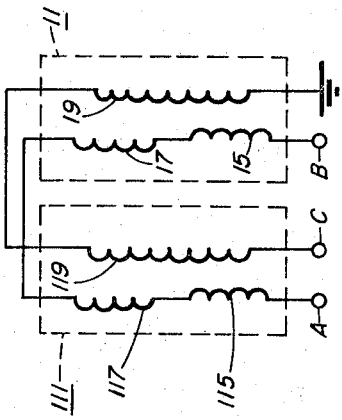

FIG. 4 of this invention illustrates the winding arrangement and connections of the densitometer of this invention.

Referring now to FIG. 1 of the drawings, a differential transformer 11 in combination with the bellows 13 containing a test chamber. Transformer 11 is comprised of primary windings 15 and 17 and secondary winding 19. The transformer assembly and the bellows is housed within a cylindrical casing 21. The primary windings 15 and 17 are wound about cylindrical member 23 which is supported within the casing 21 by spacers 25, 27 and 29. The secondary winding 19 is wound around nonmetallic tube 31 which is slideably mounted within cylinder 23 by spacers or washers 33 and 35. Electrical terminals 37 and 39, shown, are provided in the end plate 41 which is fixedly attached to the end of the cylindrical body 21 by bolt members 43. Other electrical terminals, not shown, are provided for connections to the secondary winding. A rod 45 which is mounted within plate 41 and coaxial with cylindrical casing 11 carries a helical spring 47 which is movable axially. One end of cylindrical spring 47 presses against the end plate 41 and the other end of spring 47 presses against an inner cylinder 48 which surrounds said rod or shaft 45 and pushes at one end thereof against the tube 31. A coil spring 49 presses against end plate 41 at one end thereof and against spacer 25 at the other end thereof. Spring 49 urges the primary coil assembly into a position in which cylinder 23 presses against shoulder 51 of cylindrical body 21. The space 53 surrounding bellows 13 may be provided with holes 56 and 58 for entry of fluids into the inside of the cylindrical casing 21 from the area external to the cylinder casing. Other holes such as hole 58 may be provided for entry of fluid into the cylinder 21. Under actual operating conditions, the entire differential transformer and bellows assembly is housed within an outer casing 57 having a supply or pressure line 59 for filling the entire volume within the casing with a hydraulic fluid under pressures ranging from atmospheric up to approximately 1000 atmospheres or approximately 15,000 pounds per square inch. A hydraulic fluid to be tested for density or compressibility is placed within the test chamber of bellows 13 through the threaded opening provided when bolt 61 is removed. After the test chamber is filled with the hydraulic fluid to be tested, bolt 61 is replaced and the test chamber of bellows 13 is sealed. When the hydraulic fluid is introduced into casing 57 through pipe 59, the fluid will flow through holes 56 and 58 into the chamber surrounding the bellows as well as all of the open areas around the primary and secondary windings of the transformer and all of the open areas within the cylindrical casing or body 21.

Referring now to FIG. 2 of the drawings in which the differential transformer with the micrometer head as illustrated, transformer assembly 111 comprises primary coils 115 and 117 and secondary coil 119. The transformer is housed within cylindrical casing or body 121. An inner cylindrical tube 123 which is concentrically disposed with relation to cylinder body 121 contains the primary windings 115 and 117, spacers 125, 127, 129 are fixedly mounted on cylinder 123 and slideably movable with respect to the cylinder body 121. The secondary winding 119 is wound upon a cylinder tube 131 which is held concentrically within cylinder 123 by spacers 133 and 135. Electrical terminals 137 and 139 are provided for making electrical connections to transformer windings. Other electrical terminals, not shown, are provided for additional electrical connections. An end plate 141 is fixedly attached to the cylinder 121 by means of bolts 143. A rod or shaft 145 is disposed centrally within the transformer structure and is supported at one end by end plate 141. A coil spring 147 surrounds shaft 145 and presses against the front part of tube 131 through cylinder 148. Coil spring 149 which surrounds inner cylinder 123, presses against the washer 125 at one end and against the end plate 141 at the other end thereof. Spring 149 fixedly holds the primary windings 115 and 117 in a stationary position in which cylinder 123 is pressed against shoulder 151 of the cylindrical body or casing 121. A micrometer 153 having a movable shaft 155 is mounted within the end of the cylindrical casing 121 and held in place by set screw 157. Micrometer 153 has a fixed portion 159 containing a scale 161 and rotatable head 163 containing vernier scale 165. When the rotatable head 163 of the micrometer is rotated shaft 155 will be displaced laterally moving the nonmetallic tube 131 and thus moving the position of the secondary coil with respect to the primary windings.

Referring now to FIG. 3 of the drawings, primary windings 15 and 17 which are connected in series opposition are further connected in series with primary windings 115 and 117 which are connected in series opposition. The entire circuit is connected to a source of A.C. voltage through terminals A and B. Secondary windings 19 and 119 are serially connected together. One end of the series connection is connected to the ground and the other end to terminal C. With such arrangement or any similar bridge type arrangements the output of windings 19 and 119 will be zero when they are placed exactly in the center between windings 15 and 17 and windings 115 and 117, respectively. When winding 19 is shifted due to a change in the pressure within the bellows, a voltage will be developed in winding 19. The balancing micrometer transformer may then be adjusted such that the winding 119 will be in the same position physically as winding 19 and will have an induced voltage equal to and opposite to that produced by winding 19. A reading of the micrometer which indicates a displacement of the coil from secondary winding 119 may then be taken and knowing the parameters of the bellows the displacement, the compressibility or the density of the liquid may be ascertained. Any suitable bridge arrangement may be used with the two differential transformers of this invention.

Referring now to FIG. 3 of the drawings in which a balancing bridge circuit is shown, an oscillator 201 is used for generating an A.C. voltage which is amplified by amplifier 203 and applied to primary winding circuit 205 and to a diode detector circuit 207. A secondary winding circuit 209 is connected to the ring diode detector through a second amplifier 211 and a meter M is connected between the ring diode detector and ground. In comparing the winding connections of FIG. 3 and FIG. 4 it is noted that terminals A, B and C of FIG. 4 are connected to terminals A', B' and C' of FIG. 3.

In operation an A.C. rference voltage is applied from amplifier 203 to the primary windings and to the diode rectifier 207. The application of this A.C. reference voltage to diode rectifier 207 causes the rectifier to be in a conducting state during alternate half-cycles of operation. That is, for example, suppose diode rectifier 207 is in a conducting state during half-cycles of operation when terminal B' is positive, then the diode detector will be in a non-conducting state during the half-cycles when terminal B' is negative. Diode rectifier 207 is thus in a conductive state every other half cycle of the A.C. reference voltage applied to the rectifier from amplifier 203. The output voltage from the secondary circuit comprises of the serial connection of windings 19 and 119 will be either in phase with or out of phase with the A.C. reference voltage applied from amplifier 203. Other phase relationships such as a quadrative phase relationship may be corrected by phase adjustments in the circuit of amplifier 211. When the output voltage from the secondary windings is in phase with reference voltage current will flow through meter M in one direction and when the output voltage from the secondary windings is 180° out of phase with the reference voltage, current will flow in the opposite direction through meter M.

Obviously many modifications and variations of the present invention are made possible in the light of the above teachings. It is therefore to be understood, that within the scope of the appended claims, the invention may be practiced otherwise than as specifically described.

What is claimed as new and desired to be secured by Letters Patent of the United States is:

1. Apparatus for determining the compressibility of hydraulic fluids comprising,
   a cylindrical casing,
   a first primary winding within said casing, a second primary winding within said casing,
   a first secondary winding within said primary windings and disposed centrally therebetween, said first primary winding, said second primary winding, and said first secondary winding constituting a first differential transformer,
   said secondary winding being laterally movable with respect to said primary windings,
   a bellows mounted within one end of said cylindrical casing, said bellows being mechanically connected to said first secondary winding for lateral movement therewith whereby a change in volume of said bellows will change the location of said secondary winding, said bellows further being adapted to hold a sealed hydraulic fluid therein for testing the compressibility thereof, means for applying fluid pressure externally to said bellows whereby said hydraulic fluid may be compressed,
   a first primary circuit comprising said first primary winding and said second primary winding connected in series opposition,
   a second cylindrical casing,
   a second differential transformer within said second casing comprising a third primary winding, a fourth primary winding, and a second secondary winding disposed within said primary windings, a second primary circuit comprising said third primary winding and said fourth primary winding in series opposition, a micrometer mounted within one end of said second cylindrical casing and connected to move laterally with the movement of said second secondary winding, whereby the lateral movement of said second secondary winding may be measured, means for connecting said first primary circuit and said second primary circuit to an A.C. voltage source whereby said first and second transformers may be energized, an electrical indicator, means connecting said first and second secondary windings in series opposition to said electrical indicator whereby the displacement of said bellows may be determined by adjusting said micrometer until said electrical indicator is at a null position.

2. Apparatus for determining the compressibility of a hydraulic fluid comprising, a first differential transformer having a first primary winding, a second primary winding, and a first secondary winding mounted within said primary windings and movable laterally thereto, a bellows mechanically connectable with said first secondary winding and laterally movable therewith, said bellows adapted to sealably contain a test hydraulic fluid therein, means for applying pressure externally to said bellows whereby said test hydraulic pressure may be compressed.

a second differential transformer comprising a third primary winding, a fourth primary winding, a second secondary winding mounted within said third and fourth primary windings and movable laterally thereto, micrometer means mechanically connected to said second secondary winding for movement therewith, a first primary circuit comprising said first primary winding and said second primary winding connected in series opposition, a second primary circuit comprising said third primary winding and said fourth primary winding connected in series opposition.

means for connecting said first and second primary circuits to an A.C. voltage source, means connecting said first and second secondary windings in series opposition to an output meter, whereby the position of said second secondary winding may be adjusted until a null reading is attained in said output meter and the lateral displacement of said bellows may be indicated on said micrometer.

3. Apparatus for determining the compressibility of hydraulic fluids comprising, a first differential transformer having a first primary winding, a second primary winding and a first secondary winding, said first secondary winding connected to a bellows and movable therewith, a second differential transformer having a third primary winding, a fourth primary winding, and a second secondary winding, said second secondary winding connected to a micrometer and movable therewith, an A.C. reference voltage source, means serially connecting said first, second, third and fourth primary windings to said A.C. reference voltage source, a ring diode detector having a first input circuit and a second input circuit, means connecting said A.C. reference voltage to said first input circuit, a current indicating meter, amplifier means serially connecting said first and second secondary windings to said second input circuit and to said meter, means for sealing a hydraulic fluid to be tested within said bellows, means for applying a pressure externally to said bellows.

4. Apparatus for determining the compressibility of liquids comprising, a first differential transformer having a first primary circuit and a first secondary winding, said first secondary winding adapted to produce an output voltage when displaced from a central position with respect to said primary circuit when said primary circuit is energized, a bellows mechanically connected to said first secondary winding and movable therewith, said bellows containing a liquid to be tested, means for applying a pressure externally to said bellows, a second differential transformer having a second primary circuit, and a second secondary winding, said secondary winding adapted to produce an output voltage when displaced from a central position with respect to said primary circuit when said primary circuit is energized, a micrometer assembly having a movable shaft connected to said second secondary winding and movable therewith, an A.C. voltage source, means serially connecting said A.C. voltage source to said first and second primary circuits, means connecting said first and second secondary windings to a balancing bridge circuit.

5. Apparatus for determining the compressibility of a liquid comprising, a first transformer having a first non-metallic cylinder with a first primary winding thereon, a second primary winding thereon, said second primary winding being longitudinally displaced from said first primary winding, a first secondary winding within said cylinder located centrally between said first and second primary windings and movable longitudinally thereto, a bellows, said bellows adapted to contain a liquid to be tested, means connecting said bellows to said first secondary winding and movable therewith whereby changes in volume of to said bellows causes said secondary winding to move, means applying a liquid pressure externally upon said bellows, a second transformer having a second non-metallic cylinder with a third primary winding and a fourth primary winding thereon, said fourth primary winding being longitudinally displaced from said third primary winding, a second secondary winding within said cylinder located centrally between said third and fourth primary windings and movable longitudinally thereto, a micrometer having a slidable shaft, said shaft connected to said second secondary winding whereby a movement of said micrometer shaft causes said second secondary winding to move therewith, an A.C. voltage source, a first primary circuit including said first and second primary windings connected in series opposition, a second primary circuit including said third and fourth primary windings connected in series opposition, means serially connecting said first and second primary circuits to said A.C. voltage source, a ring diode rectifier, an electric indicating meter, means connecting said A.C. voltage source to a first pair of terminals of said rectifier whereby said rectifier is in a conducting state during alternate half cycles of said A.C. voltage source, means connecting said first and second secondary windings in series opposition with said meter and a second pair of terminals on said rectifier.

References Cited
UNITED STATES PATENTS

| | | |
|---|---|---|
| 1,320,881 | 6/1943 | Newton. |
| 2,586,010 | 2/1952 | Divoll _____ 336—129 |
| 2,612,774 | 10/1952 | Zener et al. _____ 73—89 |
| 2,784,048 | 3/1957 | Strimel _____ 73—89 |
| 2,880,611 | 4/1959 | Herren _____ 73—53 |
| 2,889,706 | 6/1959 | Huyser _____ 73—89 |
| 3,091,122 | 5/1963 | Pike et al. _____ 73—358 |
| 3,262,309 | 7/1966 | Anderson _____ 336—129 |

FOREIGN PATENTS

| | | |
|---|---|---|
| 949,080 | 2/1964 | Great Britain. |

RICHARD C. QUEISSER, *Primary Examiner.*

JAMES J. GILL, *Examiner.*

J. H. WILLIAMSON, *Assistant Examiner.*